(12) United States Patent
Rohloff (10) Patent No.: US 6,258,005 B1
(45) Date of Patent: Jul. 10, 2001

(54) MULTISPEED BICYCLE GEAR SYSTEM (76) Inventor: Bernhard Rohloff, Moenchebergstrasse 30, D-34125 Kassel (DE)

( * ) Notice: Subject to any disclaimer, the term of this patent is extended or adjusted under 35 U.S.C. 154(b) by 0 days.

(21) Appl. No.: 09/214,969

(22) PCT Filed: May 15, 1998

(86) PCT No.: PCT/DE98/01367

§ 371 Date: Oct. 4, 1999

§ 102(e) Date: Oct. 4, 1999

(87) PCT Pub. No.: WO98/52818

PCT Pub. Date: Nov. 26, 1998

(30) Foreign Application Priority Data

May 16, 1997 (DE) .............................................. 197 20 796

(51) Int. Cl.[7] ................................................. F16H 3/62
(52) U.S. Cl. ........................ 475/277; 475/289; 475/297; 475/340
(58) Field of Search ................................... 475/271, 277, 475/288, 289, 297, 339, 340

(56) References Cited

U.S. PATENT DOCUMENTS

| | | | |
|---|---|---|---|
| 5,273,500 | * 12/1993 | Nagano | 475/297 |
| 5,322,487 | * 6/1994 | Nagano | 475/297 |
| 5,527,230 | * 6/1996 | Meier-Burkamp | 475/339 |
| 5,540,456 | 7/1996 | Meier-Burkamp et al. | 280/236 |
| 5,562,563 | * 10/1996 | Shoge | 475/289 |
| 5,961,416 | * 10/1999 | Shoge | 475/297 |
| 5,967,937 | * 10/1999 | Matsuo | 475/297 |
| 6,048,287 | * 4/2000 | Rohloff | 475/289 |

FOREIGN PATENT DOCUMENTS

| | | |
|---|---|---|
| 41 42 867 A1 | 7/1992 | (DE) . |
| 42 03 509 A1 | 8/1993 | (DE) . |
| 43 42 347 C1 | 2/1995 | (DE) . |
| 0 531 608 A3 | 3/1993 | (EP) . |
| 0 383 350 B1 | 6/1995 | (EP) . |

* cited by examiner

*Primary Examiner*—Sherry Estremsky
(74) *Attorney, Agent, or Firm*—Michael J. Stricker (57) ABSTRACT

The invention relates to a multispeed gearshift mechanism for bicycles. The gearshift mechanism contains a shaft (1), which can be mounted, fixed against relative rotation, on a bicycle frame, an actuator (7), rotatably seated on the shaft (1), a shell (12), rotatably seated on the shaft (1), and a gearshift mechanism, which is provided with a first and a second planetary gear (15, 16) and is arranged in the shell (12) for making available several gear ratios between the actuator (7) and the shell (12). The planetary gears (15, 16) have at least respectively two sun wheels (19, 20, or respectively 22, 23), which are coaxial in relation to the shaft (1) and which can be selectively connected by means of a shifting device with the shaft (1). In accordance with the invention, the shifting device has means (31, 32) for the selective connection of the ring gear (24, 25) or the planet carrier (17, 21) of the first and/or second planetary gear (15, 16) with a sun wheel (19, 22) of the same planetary gear (15, 16) (FIG. 6).

22 Claims, 8 Drawing Sheets

MULTISPEED BICYCLE GEAR SYSTEM

BACKGROUND OF THE INVENTION

The invention relates to a multispeed gearshift mechanism.

Multispeed gearshift mechanisms for bicycles, in particular in the form of multispeed gearshift mechanism hubs, are known in many embodiments. Like derailleurs, they are used to provide several selectable gear steps, or respectively gear ratios. Up to now it has been possible to realize up to twelve gear steps with such gears. However, a problem here lies in that the intervals between the individual gear steps desired in individual cases can be optimally designed at most with great constructive outlay and only for a small number of gear steps. It is furthermore disadvantageous that the known gearshift mechanisms have poor efficiency because of unfavorable tooth number conditions and planet wheels seated in sliding bearings, and that gear wheels with numerous different amounts of teeth are required for producing gearshift mechanisms corresponding to selectable gear steps.

In connection with a known multispeed gearshift mechanism hub of this type (DE 43 42 347 C1), the gearshift mechanism is constituted by three planet wheel gears, hereinafter called planetary gears for short. In this case the first and second planetary gears are provided with a common planet wheel carrier, or respectively strip, hereinafter called planet carrier for short, while the third planetary gear is designed as a differential gear, whose planet carrier is connected with the ring gear of the first planetary gear. In addition, in a first variant the ring gear of the differential gear is connected with the hub shell, while the sun wheel of the differential gear is coupled with the ring gear of the second planetary gear. Vice versa and in contrast thereto, in a second variant the sun wheel of the differential gear is connected with the hub shell, and the ring gear of the differential gear is coupled with the ring gear of the second planetary gear. A total of twelve gear steps can be realized by the combination of the gear ratios made available by the first and second planetary gears. However, poor efficiency results, since a high reactive power flow is generated because of the special type of coupling. Furthermore, structural hub sizes of undesirable size and weight occur because of the large diameter of the differential gear.

In connection with a further known multispeed gear of the species identified at the outset (DE 41 42 867 A1), two planetary gears connected in series and having a common planet carrier are provided, wherein the first planetary gear provides a gear ratio of more than one, i.e. a reduction, and the second planetary gear a gear ratio of less than one. Seven or nine gear steps can be realized, because on the driving side the actuator can be selectively connected with the ring gear or the planet carrier of the first planetary gear, and on the power take-off side the hub shell can be selectively connected with the planet carrier or the ring gear of the second planetary gear. However, in the process it is respectively necessary to shift the full driving or power take-off force, so that correspondingly stable, and therefore large and heavy coupling elements are required. In addition, the use of two shiftable ring gears adds considerably to the structural size and weight of the hub arrangement. Finally, this known gearshift mechanism is hard to shift under load.

Similar disadvantages result in connection with multispeed gears wherein these sun and planet wheels are respectively combined into a single planetary gear (DE 42 03 509 A1, EP 0 383 350 A1), although they also have several sun wheels and correspondingly stepped planet wheels.

SUMMARY OF THE INVENTION

In contrast to this, it is the object of the invention to design the multispeed gear of the species identified at the outset in such a way that in case of shifting actions in the driving process it is not necessary to shift the full driving or power take-off force, that smaller structural sizes and weights are achieved and that it still is possible to provide essentially the same jumps between successive gear steps.

The invention will be explained in more detail in what follows by means of an exemplary embodiment in connection with the attached drawings.

DESCRIPTION OF THE PREFERRED EMBODIMENTS

Figure 1:
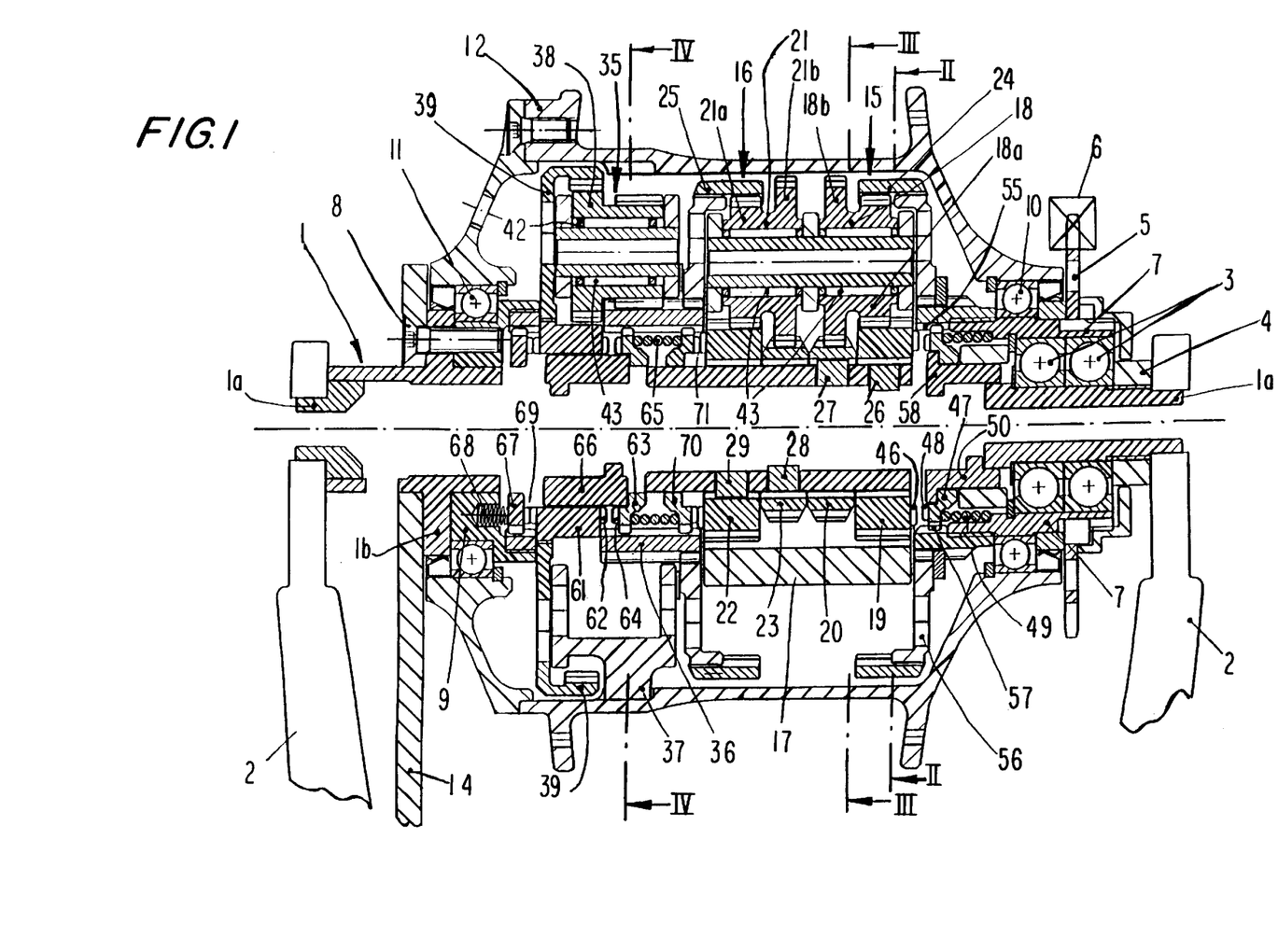
FIG. 1, a longitudinal sectional view of a multispeed gear in accordance with the invention, FIGS. 2 to 4, cross-sectional views of the planetary gears of the gear hub approximately along the lines II—II, III—III, IV—IV in FIG. 1 on a slightly enlarged scale, wherein cross-hatching of the planet and sun wheels has been partially omitted for the sake of a clearer representation, FIGS. 5 and 6, respectively basic sketches of the gear in accordance with FIG. 1 in two different positions of their shifting devices, FIG. 7, a lateral view of a clutch of the multispeed gear in accordance with FIG. 1 on an enlarged scale, FIGS. 8 and 9, sectional views along the lines VIII—VIII and IX—IX in FIG. 7, and FIG. 10, a basic sketch corresponding to FIGS. 5 and 6 of a second embodiment of the multispeed gear in accordance with the invention.

In accordance with FIG. 1, a multispeed gear specially designed as a multispeed gear hub contains a hollowly embodied hub shaft 1, whose ends 1a embodied in the manner of a trunnion are seated in correspondingly designed outlet ends of frame elements 2, which are only schematically represented, and which are mounted in these, fixed against relative rotation, for example by means of a conventional quick-action tightener, nuts or in any other way. On the drive side the hub shaft 1 is provided with roller bearings 3, which are axially fixed on it by means of a clamping ring 4. An actuator 7, which is fixedly connected with a drive pinion 5 of a chain 6 or the like, is rotatably seated on the hub shaft 1 by means of the ball bearings 3. The hub shaft 1 has a radial flange 1b on the power take-off side and at a preselected distance from the clamping ring 4, on which a seating ring 9, which has been axially drawn on the shaft hub 1, is fastened by means of screws 8 in an axially non-displaceable manner and fixed against relative rotation. A hub shell 12 is rotatably seated on the actuator 7 and the seating ring 9 by means of bearings 10 and 11. In this case the drive pinion 5, the actuator 7 and the hub shell 12 are located coaxially in relation to the hub shaft 1. In addition a support 14 connected, fixed against relative rotation, with the seating ring 9 and the flange 1b and which is to be connected with one of the frame elements 2, can be provided, which is used for supporting the difference between the torque introduced by the actuator 7 into the gear hub and the torque passed on via the gear hub 12 to a rear wheel of the bicycle, wherein the rear wheel, not represented, is connected in the conventional manner by means of spokes or the like with the hub shell 12. If the gear hub is provided with a brake, not represented, the support 14 also takes on the support of the braking moment.

A gearshift mechanism is seated in the hub shell 12 and contains two planetary gears 15 and 16, which are arranged one behind the other on the hub shaft 1 and are provided with a common planet carrier 17, preferably made of one piece. The first planetary gear 15, situated on the drive side and in the vicinity of the actuator 7, contains, as can be seen in particular from FIGS. 2, 3, 5 and 6, a planet carrier section with at least one first planet wheel 18, having at least two stages 18a, 18b of different diameters, wherein the stage 18a has a smaller diameter and meshes with a first sun wheel 19 of a comparatively large diameter, while the stage 18b, which has a larger diameter, is in engagement with a second sun wheel 20, which has a correspondingly smaller diameter. The second planetary gear 16, which is axially farther distant from the actuator 7, contains a planet carrier section with at least one second planet wheel 21, which also has at least two stages 21a, 21b of different diameters, wherein the stage 21a with the smaller diameter is in engagement with a third sun wheel 22 of comparatively large diameter, and the stage 21b having the larger diameter is in contact with a fourth sun wheel 23, which has a correspondingly smaller diameter. In this case it is understood that the described planet and sun wheels, as well as the planet carriers can rotate around the hub shaft 1 in the usual way.

Finally, the planetary gears; 15, 16 each have a first, or respectively second ring gear 24, or respectively 25, which are coaxial in respect to the hub shaft 1, wherein the ring gear 24 is in engagement with the stage 18a and the ring gear 25 with the stage 21a of the first, or respectively second planet wheel 18, or respectively 21.

A gearshift mechanism is additionally intended for the provision and selection of several gear ratios between the actuator 7 and the hub shell 12, which has means 26, 27, 28 and 29, schematically indicated in FIGS. 2 to 6, preferably in the form of clutches, by means of which the sun wheels 19, 20, 22 and 23 can be selectively connected with the hub shaft 1. The clutches 26 to 29 are, for example, embodied as free-wheeling ratchet devices, which can be controlled from outside of the gear hub by means of customary shift levers or the like.

Multispeed gear hubs of this type intended for bicycles are generally known to one skilled in the art and therefore need not be explained in greater detail. To prevent repetitions, reference is made here, for example, to the printed publications DE 41 42 687 A1 and DE 43 42 347 C1, which here are made the subject of the present disclosure in order to prevent repetitions.

In accordance with a particular characteristic of the invention, the planetary gear 15 is driven at its ring gear 24, which to this end is connected, fixed against relative rotation and axially non-displaceable, with the actuator 7. In addition, in connection with a preferred embodiment of the invention, both planetary gears 15, 16 are constructed and arranged laterally reversed in relation to an imaginary plane of symmetry extending between them, and vertically in relation to the hub shaft 1 wherein, for example, the two planet wheel stages 18b, 21b with the larger diameter are immediately facing each other (FIGS. 1 and 5), while the two planet stages 18a, 21a having the smaller diameter are at greater distances from the imagined plane of symmetry. In this case the stages 18a, 21a preferably have identical diameters and number of teeth, and the same applies to the diameters and number of teeth of the stages 18b, 21b. It is possible to greatly reduce the costs of production and storage by means of this laterally reversed design. It is correspondingly possible to embody the sun wheels 20, 23, or respectively 19, 22, and the ring gears 24, 25 in identical pairs. Therefore only five numbers of teeth must be fixed on four different components 18, 19, 20 and 24, since the components 21, 22, 23 and 24 correspond identically to the components 18, 19, 20 and 24.

Figure 5:
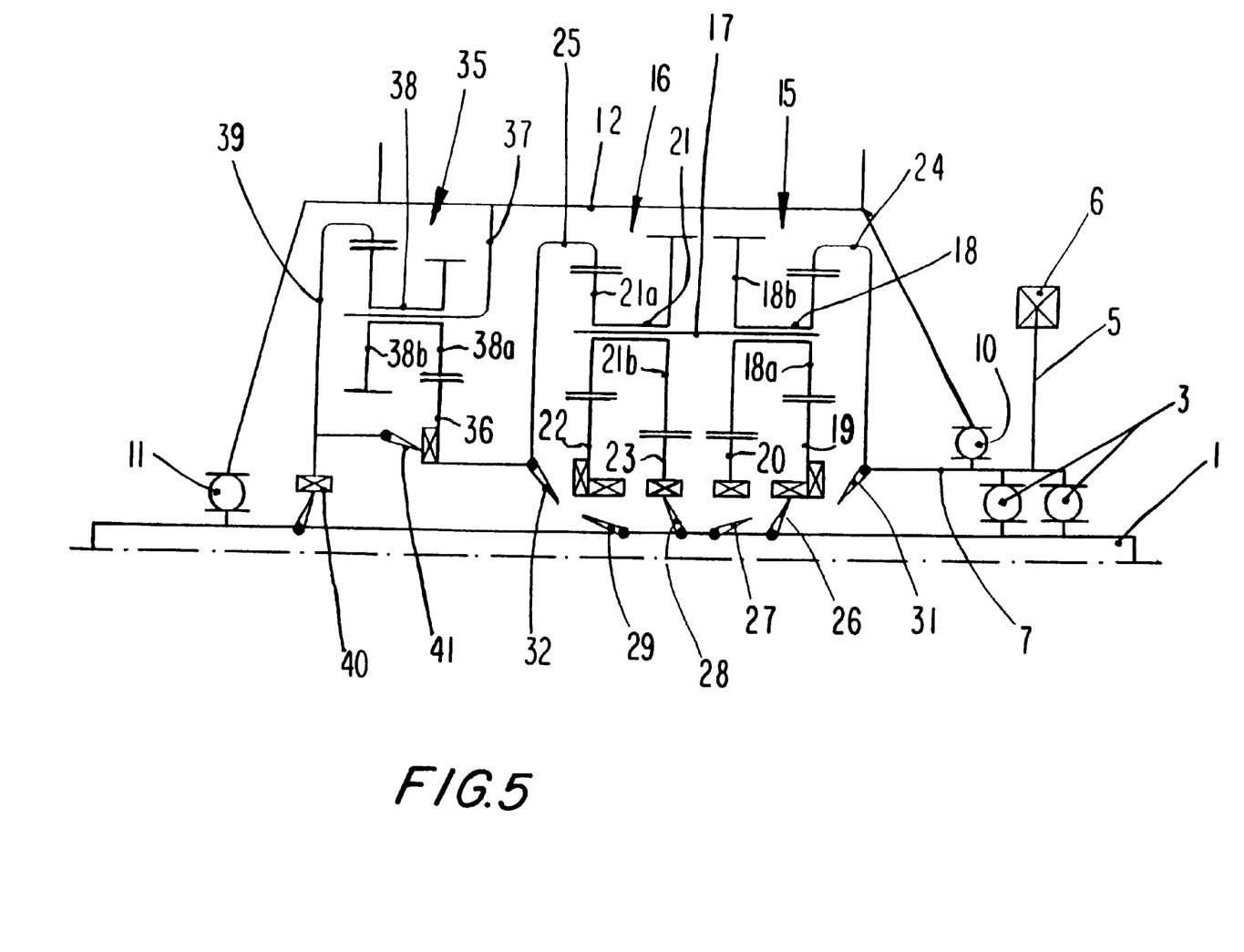
Figure 6:
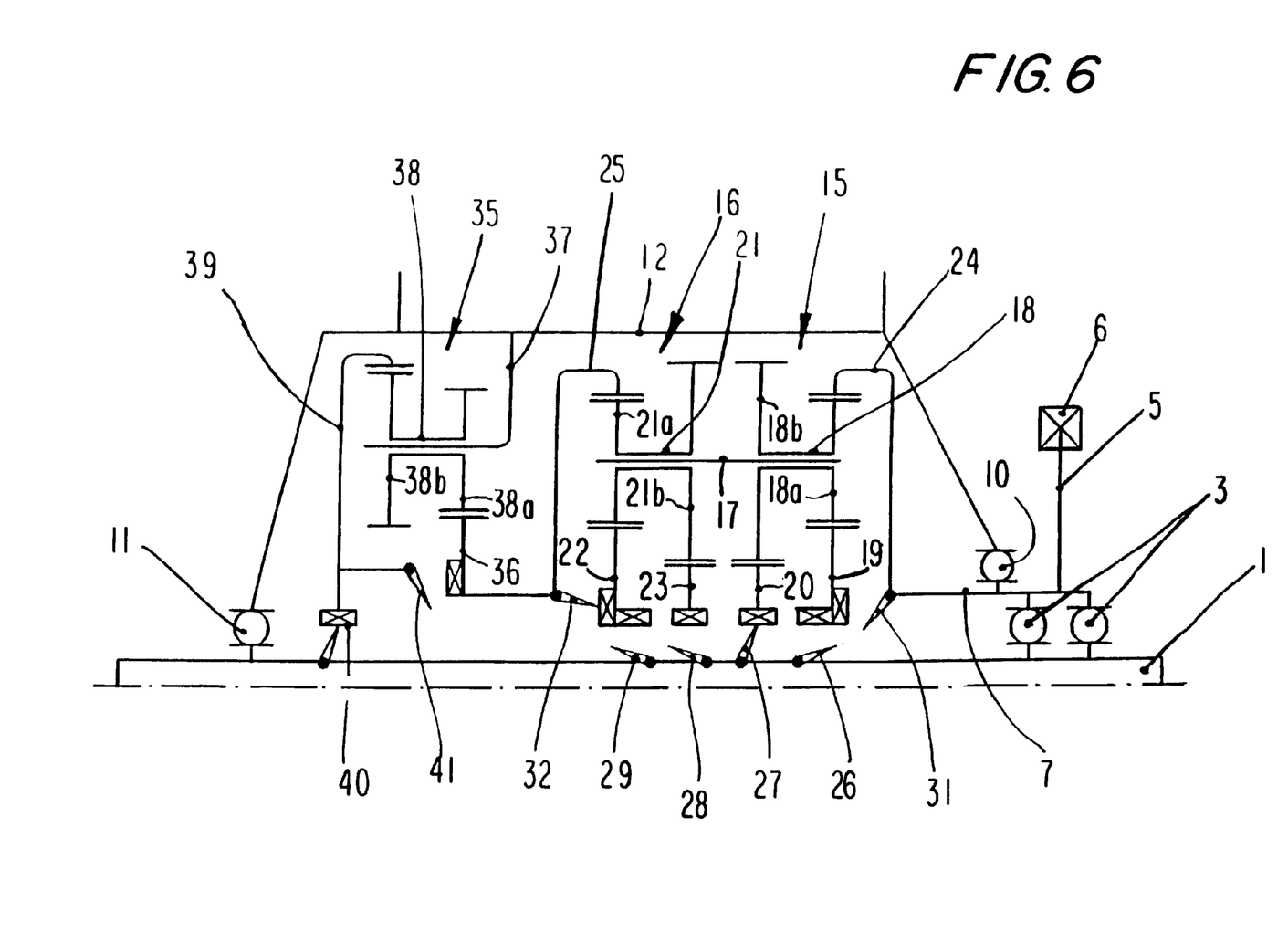

If the described gearshift mechanism is only used as a seven speed gear, the second ring gear 25 of the planetary gear 16 is used for power take-off, which in this case and differently from FIGS. 1 and 5, 6, could be directly and rigidly connected with the hub shell 12. If in this case a free-wheeling device is desired for the hub shell 12, the ring gear 25 could be connected, for example, with a ratchet wheel carrier having free-wheeling ratchets which work together with appropriate teeth in the hub shell 12 in such a way that a transfer of torque can take place only in one direction.

With such a variant, the four clutches 26 to 29 are initially used for providing different gears. Since here the actuator 7 is fixedly connected with the first ring gear 24, and the second ring gear 25 is fixedly connected with the hub shell 12, the first and the third sun wheels 19, 23, for example, are connected by means of the clutches 26 and 28 with the hub shaft 1 (FIG. 5), while the sun wheels 20, 22 can freely rotate. Because of this the first planetary gear 15 determines the rpm for the planet carrier 17 which, in turn, drives the planet wheel 21. The latter rolls off on the fixed third sun wheel 23, which by means of this determines the rpm of the second ring gear 25 and therefore of the hub shell 12. A further total gear ratio can be provided in that the clutches 27, 29 are engaged and the clutches 26, 28 disengaged, so that now the sun wheels 20, 22, which are connected with the hub shaft 1, determine the total gear ratio. Further gear ratios can be provided in that the sun wheels 19, 22, or respectively 20, 23 are connected with the hub shaft 1. However, with a laterally reversed design of the two planetary gears 15, 16, this respectively results in a total gear ratio of 1:1, i.e. in a direct gear step.

There are numerous possibilities for the special design of the clutches 26 to 29. But clutches of the type of interest here are preferably provided with shiftable ratchets or the like and with free-wheeling devices, so that the respective sun wheels 19, 20, 22 and 23 are only stopped in one direction of rotation, but can turn in the opposite direction of rotation. This results in the advantage that the clutches can also be easily shifted when under a load in that, when putting in a new gear, the sun wheel which had been active up to that time, for example, remains connected for a short time and therefore no interruption of the flow of force occurs. If the new gear is a faster gear, it becomes immediately effective, since the sun wheel, which had been active up to that time, can continue to run by means of the free-wheeling device as long as it is connected. But if the new gear is a slower gear, the sun wheel which had been active up to that time continuously remains active until it is turned off, since in this case the newly selected sun wheel can pass via the free-wheeling device. Clutches of this type are generally known (DE 41 42 867 A1) and therefore need not be explained in greater detail. Alternatively it would of course also be possible to employ rigid claw clutches or the like, in which case a short period of idle running, or respectively an interruption of the flow of force, would have to be provided between the disengagement of the old gear and the engagement of the new gear. A preferred embodiment will be explained further down below.

In accordance with a further, particularly essential characteristic of the invention, the shifting device has two further clutches 31 and 32 (FIGS. 5, 6) for increasing the number of gear steps in spite of the use of the common planet carrier 17, of which the clutch 31 is used for the selective connection of the first ring gear 24 with the first sun wheel 19, while the second ring gear 25 can be selectively coupled with the fourth sun wheel 22 by means of the second clutch 32. By means of this, when the first clutch 31 is connected, the first planetary gear 15 is blocked and, when the second clutch 32 is connected, the second planetary gear 16 is blocked, i.e. the planet carrier 17 always turns at the rpm of the actuator 7 when the clutch 31 is connected while, with the clutch 32 connected, the second ring gear 25 always rotates at the rpm of the common planet carrier 17. Preferably the two clutches 31, 32 are designed the same as the above mentioned clutches 26 to 29. An alternative embodiment will be explained further down below.

With the laterally reversed construction of the planetary gears 15, 16, it is possible by means of the clutches 31, 32 to set further gear steps in addition to the two gear steps described above, as follows: if the clutch 31 is engaged and the clutch 32 is disengaged, it is possible by means of the clutches 28, 29 to selectively connect the sun wheel 23 or the sun wheel 22 with the hub shaft 1 and to release the respectively other sun wheel, which results in two gear ratios, determined by the second planetary gear 16, between the planet carrier 17 and the hub shell 12, because the gear ratio of the first planetary gear is 1:1. But if the clutch 32 is engaged and the clutch 31 disengaged (FIG. 6), the gear ratio of the second planetary gear 16 is fixed at 1:1, while two gear ratios, determined by the first planetary gear 15, between the actuator 7 and the planet carrier 17 can be adjusted, in that one of the sun wheels 19, 20 is selectively connected with the hub shaft 1 by means of the clutches 26, 27. Finally, by engaging both clutches 31, 32 it is also possible in this way to provide a gear ratio 1 : 1 between the actuator 7 and the hub shell 12. Therefore the described multispeed hub is a seven speed gear hub.

A particular characteristic of the two clutches 31, 32 lies in that by means of them the sun wheels 19, 22 are connected with the actuator 7, or respectively the hub shell 12, in addition to the associated ring gear 24, or respectively 25, and not instead of these. Therefore, when actuating the clutches 31, 32, always only a portion of the drive or power take-off force coming from the actuator 7, or respectively exerted on the hub shell 12, is shifted, and the shifting has the only purpose of blocking the respective planetary gear or to cancel the blockage. Because of the special configuration of the described gearshift mechanism, it is possible to achieve that, for example, only approximately 50% of the total force must be shifted. In contrast to this, with the state of the art as the 100% of the drive and power take-off force are shifted between a ring gear and an associated planet carrier or vice versa in order to create a second force transmission path in this way. Therefore the gearshift mechanism in accordance with the invention provides the advantages that it is only necessary to exert considerably reduced forces on the clutches and the shifting elements, can therefore be laid out smaller and lighter, or respectively, that considerably greater drive, or respectively power take-off forces can altogether be transmitted with the same clutch forces. This also has a positive effect on the forces which must be exerted for operating the clutches 31, 32 when shifting under a load.

The described seven speed gearshift mechanism can be converted into a fourteen speed gearshift mechanism by a simple add-on set. In accordance with FIGS. 1 and 5, 6, a third planetary gear 35 with a fifth sun wheel 36, a second planet carrier 37 with at least a third planet wheel 38 and a second ring gear 39 are provided for this. The planet wheel 38 has two stages 38a, 38b (FIGS. 4 to 6) of different diameters. The stage 38a with the smaller diameter is in engagement with the fifth sun wheel 36, the stage 38b with the larger diameter is in engagement with the second ring gear 39, which is furthermore secured against reverse rotation by a free-wheeling device 40 (FIG. 5) supported on the hub shaft 1. In addition, the fifth sun wheel 36 is fixedly connected with the second ring gear 25 and is for example made of one piece with it (FIG. 1). Finally, in this case the third planet carrier 37 is fixedly connected with the hub shell 12, while the second ring gear 25 with the fifth sun wheel 36 can be jointly selectively connected with the third ring gear 39 or disengaged from it by means of a further clutch 41 having a free-wheeling device. If the clutch in accordance with FIG. 5 is engaged, the third planet carrier 37 turns at the rpm of the second ring gear 25, i.e. the third planetary gear 35 is blocked at a gear ratio of 1:1, so that it is out of action and the above explained gear steps can be realized. However, if the clutch 41 is disengaged in accordance with FIG. 6, the power take-off rpm of the second ring gear 25 are transmitted via the fifth sun wheel 36 on the third planet carrier 37, since the ring gear 39 is supported, fixed against relative rotation, on the hub shaft 1 via the free-wheeling device 40 and therefore the planet wheels 38 driven by the sun wheel 36 take the planet carrier 37 along. In this case the third planetary gear 35 acts, for example, as a reduction gear with a gear ratio of less than 2:1, so that the seven gear steps described above can be made selectively effective at a direct gear ratio of 1:1 or with a downstream connected reduction gear. Furthermore, in regard to the clutch 41, the advantage described above in connection with the clutches 31, 32 has the result, that by means of it it is always only necessary to shift a portion of the driving force delivered by the second ring gear 25.

The gearshift mechanism described is operated, for example, with the number of teeth found in Table 1.

TABLE 1

| WHEEL | Number of Teeth |
|---|---|
| Sun 19 | 42 |
| Sun 20 | 35 |
| Sun 22 | 42 |
| Sun 23 | 35 |
| Sun 36 | 51 |
| Planet 18 | |
| Stage 18a | 24 |
| Stage 18b | 32 |
| Planet 21 | |
| Stage 21a | 24 |
| Stage 21b | 32 |
| Planet 38 | |
| Stage 38a | 20 |
| Stage 38b | 26 |
| Ring gear 24 | −90 |
| Ring gear 25 | −90 |
| Ring gear 39 | −96 |

The described number of teeth has the result that the first planetary gear 15 operates at a gear ratio between the actuator 7 and the planet carrier 17 of approximately 1.467:1, when the clutch 26 is engaged, and of approximately 1.292:1, when the clutch 27 is engaged. However, the gear ratio between the planet carrier 17 and the second ring gear 25 is reversed to approximately 1:292, when the clutch 28 is engaged, or respectively 1:1.467, when the clutch 29 is engaged. Because of this, the planetary gear 15 always operates as a reduction gear, but the planetary gear 16 always as a step-up gear. Finally, the gear ratio of the add-on set in the exemplary embodiment is approximately 2.448:1, so that a reduction results on the whole when the clutch 41 is disengaged, and 1:1, when the clutch 41 is engaged.

In connection with the described arrangement it is possible by means of the number of teeth recited in Table 1 to realize the, gear steps recited in Table 2. In this case, the letter "x" underneath the various clutches indicates, which clutch is in the engaged state at the respective gear step, wherein a lack of the letter "x" indicates that the respective clutch is disengaged. As in the above description, "gear ratio" is defined as the ratio of the drive rpm to the power take-off rpm.

TABLE 2

| Gear Step | Clutch | | | | | | | Gear Ratio | Step Jump |
| --- | --- | --- | --- | --- | --- | --- | --- | --- | --- |
|  | 26 | 27 | 28 | 29 | 31 | 32 | 41 |  |  |
| 1st Gear | x |  |  |  |  | x |  | 3.591 | 13.5% |
| 2nd Gear |  | x |  |  |  | x |  | 3.163 | 13.8% |
| 3rd Gear | x |  | x |  |  |  |  | 2.779 | 13.5% |
| 4th Gear |  |  |  | x | x |  |  | 2.448 | 13.5% |
| 5th Gear |  | x | x |  |  |  |  | 2.157 | 13.8% |
| 6th Gear |  |  | x |  | x |  |  | 1.895 | 13.5% |
| 7th Gear |  |  |  | x | x |  |  | 1.670 | 13.8% |
| 8th Gear | x |  |  |  |  | x | x | 1.467 | 13.5% |
| 9th Gear |  | x |  |  |  | x | x | 1.292 | 13.8% |
| 10th Gear | x |  | x |  |  |  | x | 1.135 | 13.5% |
| 11th Gear |  |  |  | x | x |  | x | 1.000 | 13.5% |
| 12th Gear |  | x | x |  |  |  | x | 0.881 | 13.8% |
| 13th Gear |  |  | x |  | x |  | x | 0.774 | 13.5% |
| 14th Gear |  |  |  | x | x |  | x | 0.682 | — |

It follows from this that comparatively constant step jumps between approximately 13.5% and 13.8% are obtained, if the relation of the ratio of one gear step to the ratio of the respectively faster gear step is called a gear jump, and the gear jump indicated for any arbitrary gear in the table indicates the transition from this gear to the respectively next gear.

It is furthermore possible by means of the described gearshift mechanism to vary the total gear ratio, i.e. the relationship between the largest gear ratio and the smallest gear ratio. In the exemplary embodiment, the total gear ratio is approximately 526%, so that a very broad range of ratio relationships is covered.

A further essential advantage of the described gear mechanism lies in that the number of teeth of the different stages of the planet wheels can be made comparatively large at 20, 24, 26 and 32. By means of this it is possible to seat the planet wheels 18, 21 and 38 rotatably in the planet carriers 17 and 37 by means of rolling bearings, in particular needle roller bearings, indicated in FIGS. 1 to 4, wherein each rolling bearing consists of a bearing cage 42, guided between two disk-shaped planet carrier elements, and a plurality of bearing needles 43 arranged in the cage, whose axes are arranged parallel in relation to the axes of rotation of the planet wheels 18, 21 and 38. It is possible by means of this to keep frictional losses small, which is advantageous for the total efficiency. Finally, the comparatively small difference between the number of teeth of the respectively meshing sun and planet wheels is also advantageous for efficiency.

A preferred exemplary embodiment of the clutch 31 is represented in FIGS. 1 and 7 to 9. In accordance with this, the sun wheel 19 is provided on its side facing the actuator 7 with saw-toothed arrangement 46, situated opposite a coupling ring 47, which is arranged coaxially in relation to the hub shaft 1 and has on its side facing the sun wheel 19 a corresponding saw-toothed arrangement 48, which fits into the tooth arrangement 46. The coupling ring 47 is prestressed by a compression spring 49, which is coaxial in relation to the hub shaft 1 and is embodied as a helical spring, whose one end is supported on the actuator (FIG. 1) and whose other end on the coupling ring 47 and tries to push the latter in the direction toward the sun wheel 19. At least one control slide 50, for example, is provided for controlling the coupling process, which is seated, displaceable in the direction of an arrow w, in an axis-parallel guide slit of the hub shaft 1 and is provided with a detent tooth 51, with which it rests, for example, against the front of the coupling ring 47 having the tooth arrangement 46. In addition, the control slide 50 has a radially inward projecting shift pin 52 which is controlled, for example, by a drum controller, not shown in detail, with guide grooves, or rests against a tang 53 attached to a control rod 54, not shown in detail, which is displaceably seated in the hub shaft 1. Here the arrangement is such that, in the position of the control rod 54 shown in FIG. 8, the coupling ring 47 is maintained against the pressure of the compression spring 49 at such an axial distance from the sun wheel 19 that the two tooth arrangements 46, 48 are not in engagement. However, if the control rod 54 is pushed further forward in the hub shaft 1, i.e. moved to the left in FIG. 8, the compression spring 49 pushes the coupling ring 47 slowly forward in the direction toward the sun wheel 19 until the two tooth arrangements 46, 48 come into engagement. Here, the inclined edges of the saw-toothed arrangements 46, 48 are aligned in the direction of rotation in such a way that, when the teeth are in engagement, the sun wheel 19 can be turned in the drive direction by the actuator 7 via the coupling ring 47. However, if the actuator 7 is turned in the opposite direction, the tooth arrangements 46, 48 can slide along each other in the manner of a free-wheeling device, since the coupling ring 47 is seated in an axially yielding manner because of the compression spring 49. The same free-wheeling effect occurs if the sun wheel 19 turns faster than the actuator 7 and in the process passes it. For uncoupling it is merely necessary to pull the control rod 54 back again, because of which the control slide 50 is also pulled back via the tang 53, the shift pin 52 and the detent tooth 51, until it again takes up the position in accordance with FIGS. 1 and 7 to 9.

Seating of the coupling ring 47 is usefully provided with the aid of a connecting tube 55 (FIG. 1), which is arranged coaxially with the hub shaft 1, is fixedly connected with the actuator 7 and on which a front face 56 of the first ring gear 24 is also fastened. On its interior surface, the connecting tube 55 has keyways, which extend axially parallel and interlockingly receive tangs 57 (FIGS. 1, 8, 9), which have been attached to the exterior surface of the coupling ring 47. In this way the coupling ring 47 can be axially displaced in the manner of a dove-tailed connection, but is also seated in the connecting tube 55 in such a way, that it follows, essentially free of play, every rotary movement exerted by the actuator 7 on the connecting tube 55.

To insure that the coupling ring 47 is evenly axially displaced and is not tilted in the process, a second control slide 58 (FIG. 8), corresponding to the control slide 50 and controlled in the same way as the latter, is preferably arranged at a location offset by 1800 in the circumferential direction of the hub shaft 1.

Figure 7:
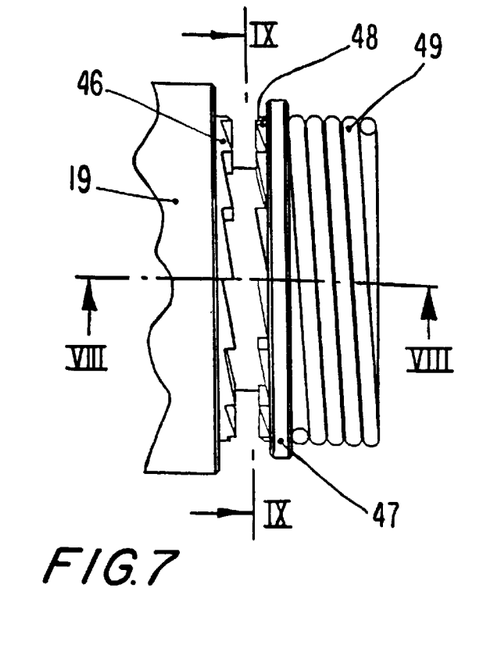
Figure 8:
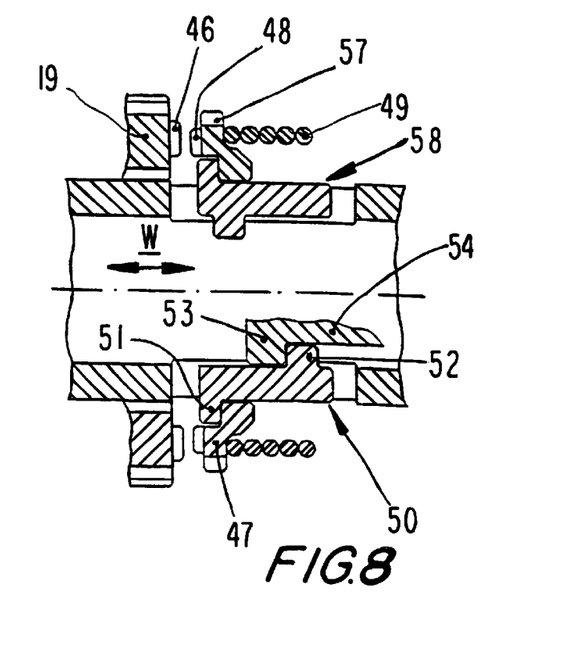
Figure 9:
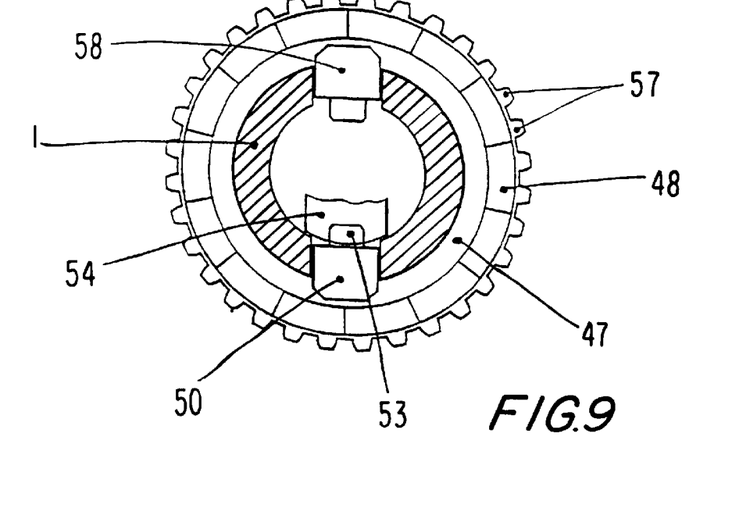

The clutch 41 (FIGS. 5, 6 and 7) is constructed analogously to the clutch 31 in FIGS. 7 to 9. Here, the ring gear 39 has a hub 61 (FIG. 1) with teeth 62 on the front, which is situated opposite a coupling ring 63 corresponding to the coupling ring 47 in FIGS. 7 to 9 and can be seen in FIG. 4, too, which has been provided with a corresponding sawtoothed arrangement 64 and is acted upon by a compression spring 65. In this case the coupling ring 63 can be axially displaced in the fifth sun wheel 36 with the aid of dove-tailed connectors 63a (FIG. 4), but is seated fixed against relative rotation in respect to the wheel. For the axial displacement of the coupling ring 63 the compression springs 65 are used on the one hand, and on the other hand at least one control slide 66 corresponding to the control slides 50, 58 in accordance with FIGS. 7 to 9, and a control rod, not represented, which corresponds to the control rod 54. Thus, in the engaged state, the sun wheel 36 takes the ring gear 39 along in the drive direction, while an oppositely rotating movement of the sun wheel 36 and a passing movement of the ring gear 39 is easily possible, based on the freewheeling effect described by means of FIGS. 7 to 9. However, if the coupling ring 63 is disengaged from the ring gear 39, the latter drives the planet carrier 37 in the manner described above, wherein the ring gear 39 is supported via the free-wheeling device 40 (FIGS. 5, 6) on the hub shaft 1. In this case the free-wheeling device 40 is represented, for example, as a coupling ring 67 which, analogously to FIGS. 7 to 9, is seated in the seating ring 9 axially displaceable, but fixed against relative rotation in respect to it, and is prestressed in the direction toward the hub 61 by at least one compression spring 68 supported on the ring. The fronts of the hub 61 and the coupling ring 67 facing each other have cooperating saw-toothed arrangements 69 corresponding to FIGS. 7 to 9, wherein the design of the teeth has been selected in such a way that either the described freewheeling effect results, or a reverse rotation of the ring gear 39 is prevented.

Finally, the clutch 32 (FIGS. 5, 6) could also be designed analogously to FIGS. 7 to 9. But it is also alternatively possible to provide a coupling ring 70 in accordance with FIG. 1, whose one front face is supported at the end of the compression spring 65 facing away from the coupling ring 63, but faces the sun wheel 22 with its other front face, and otherwise is seated displaceably, but fixed against relative rotation, in the fifth sun wheel 36, in the same way as the coupling ring 63. The facing front faces of the sun wheel 22 and the coupling ring 70 are provided with saw-toothed arrangements 71 in such a way that the sun wheel 22, or respectively the ring gear 25, can take along the coupling ring 70, and therefore also the sun wheel 36 in the drive direction. Since this is always necessary when the sun wheel 22 wants to turn faster than the ring gear 25, or respectively the fifth sun wheel 36, i.e. when none of the two clutches 28, 29 are engaged, it is not necessary to provide a separate control slide for the coupling ring 70. If the sun wheel 22 tries to turn faster than the sun wheel 36, it automatically takes the latter along because of the action of the compression spring 65 and the coupling ring 70. But if the sun wheel 22 turns slower, or not at all, because it itself or the sun wheel 23 are coupled with the hub shaft 1, the repeatedly explained free-wheeling effect takes place.

Figure 2:
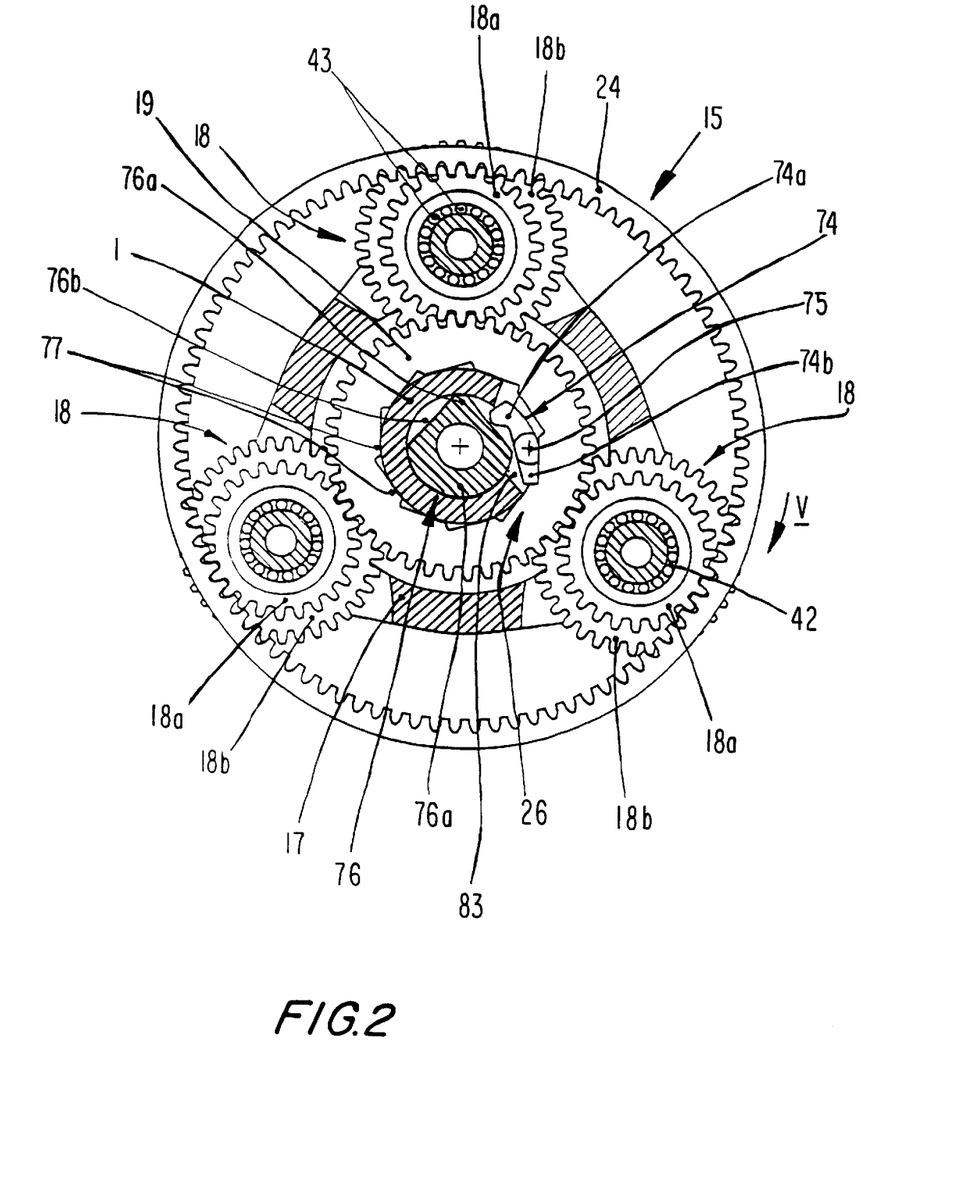
Figure 3:
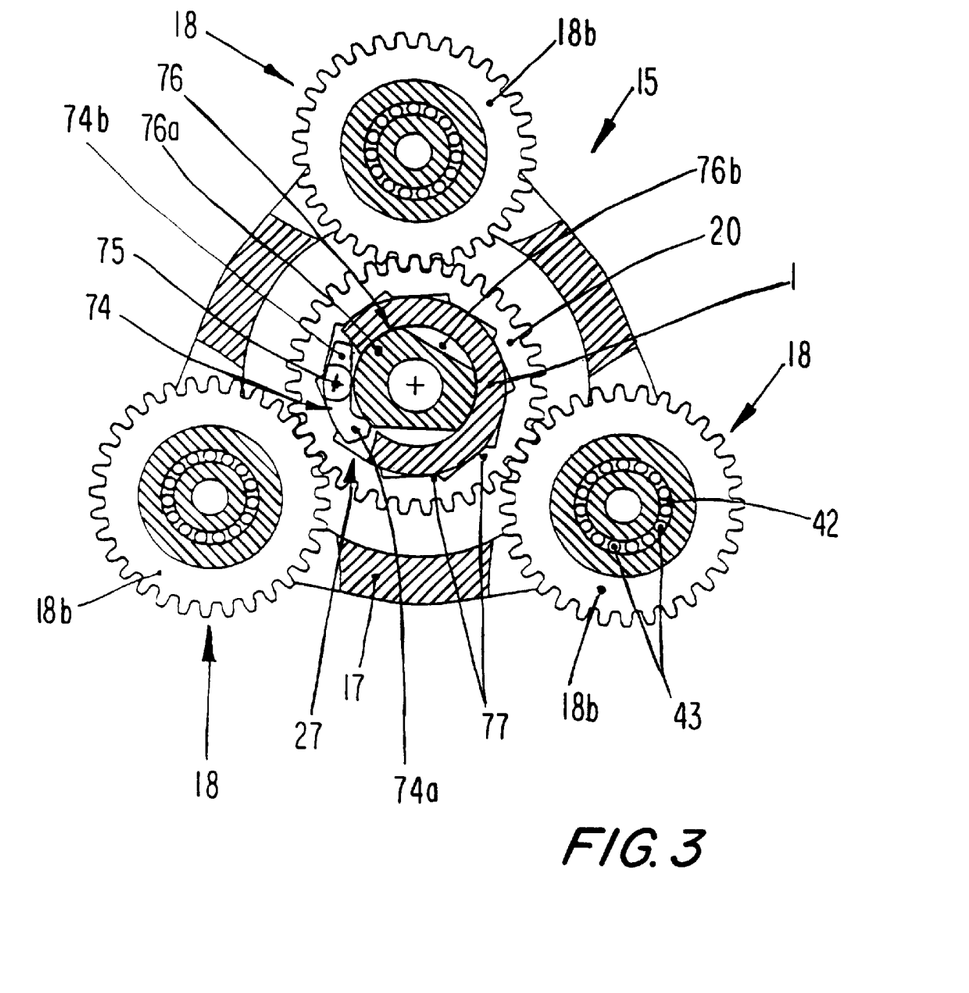
Figure 4:
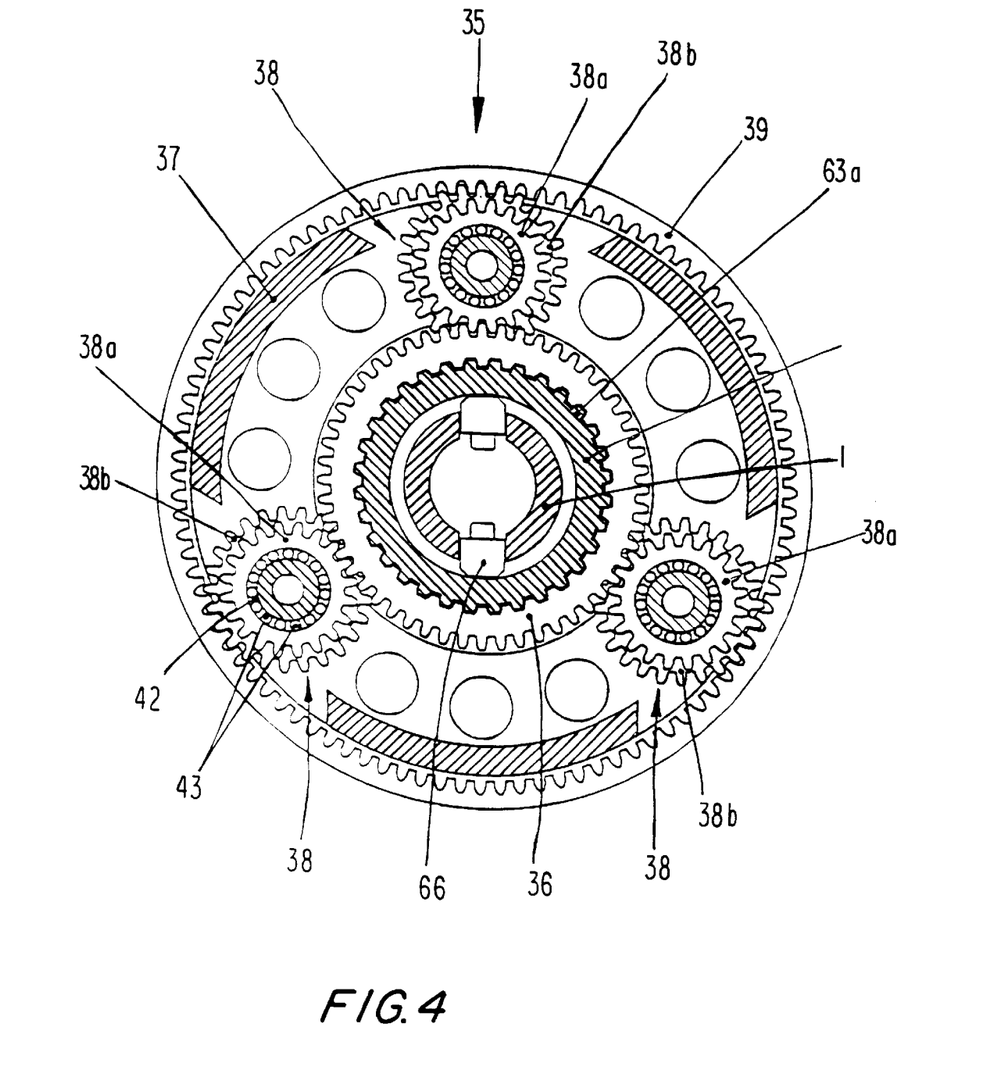

An exemplary embodiment of the clutches 26 to 29 is schematically represented in FIGS. 1 to 3 by means of the clutches 26 and 27. In accordance with this, a control lever 74 is pivotably seated in the shell of the hollow hub shaft 1 and can be turned around a pivot pin 75 extending parallel with the hub shaft 1. The control lever 74 consists of a two-armed lever, whose lever arm 74a projecting into the hub shaft 1 cooperates with a cam shaft 76, which is rotatably seated in the hub shaft 1 and which has at least respectively one cam 76a and a cam depression 76b. In addition, the sun wheel 19, or respectively 20, is provided with teeth 77 on its interior circumference in such a way, that the lever arm 74b of the control lever 74, which is embodied as a shift ratchet, can fall into the teeth, as represented in FIG. 2. In this case the arrangement has been made in such a way that, when the the lever arm 74a runs up on a cam 76a of the camshaft 76, the control lever 74 is pivoted in such a way that its lever arm 74b (FIG. 3), which has snapped into the teeth 77, is pivoted out of the latter and the sun wheel 19, or respectively 20, is released by this while, when the lever arm 74a enters into a cam depression 76b (FIG. 2), the lever arm 74b is again brought into engagement with the sun wheel teeth 77 by a spring, not represented, and therefore the sun wheel 19, or respectively 20, is stopped in respect to the drive direction of the planet carrier 17, represented by the arrow v, as shown by way of example in FIG. 2. The sun wheel 19, or respectively 20, can freely rotate (freewheeling) in the opposite direction. FIG. 1 here makes it clear that, in spite of the control slides 50, 58 and 66, there is sufficient space available in the interior of the hub shaft 1 for housing the camshaft 76.

Figure 10:
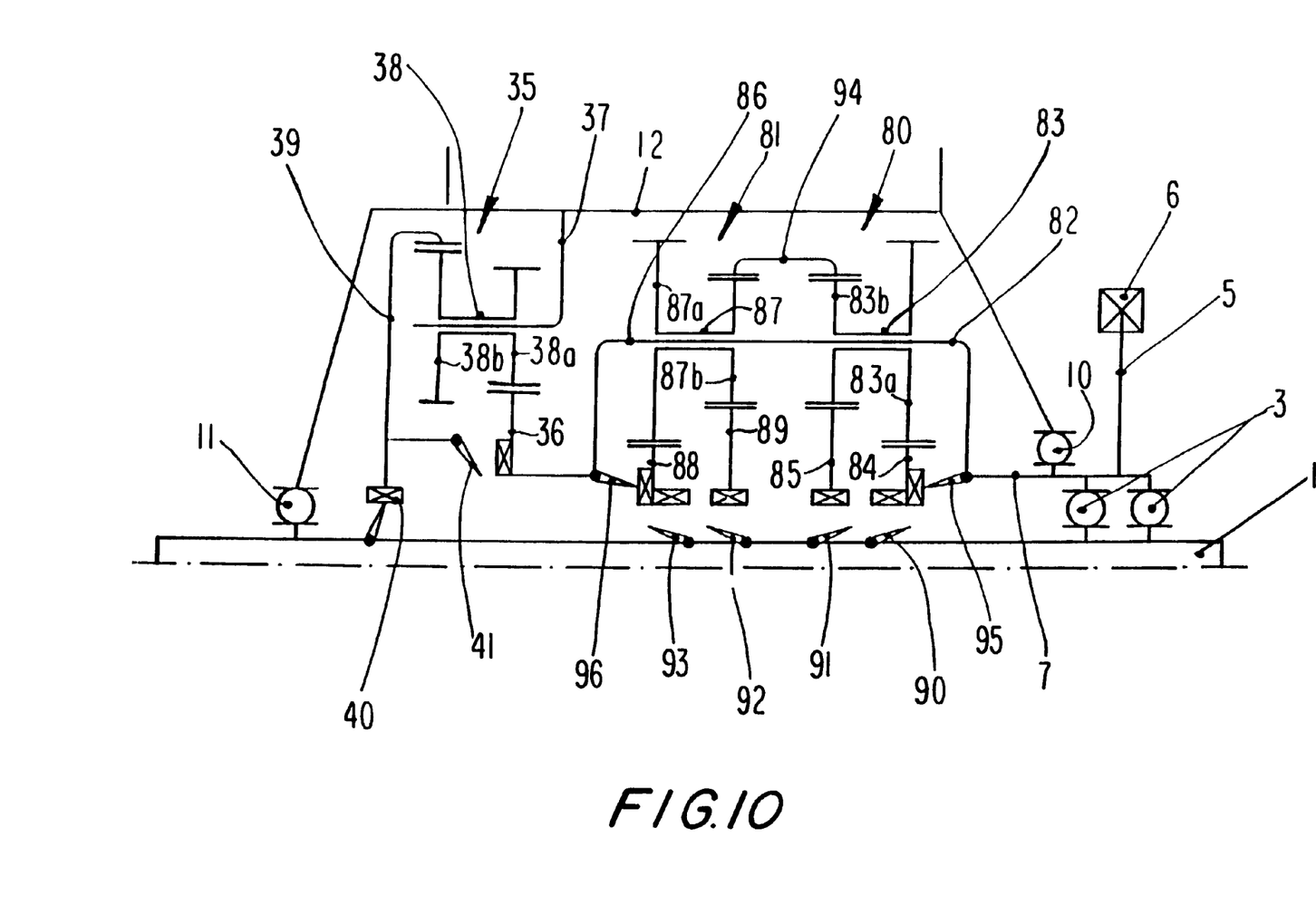

The embodiment in accordance with FIG. 10 differs only partially from the embodiment in accordance with FIGS. 1 to 9, which up to now had been considered the best embodiment, so that to the extent possible the same reference numerals were used for like elements.

A gear shift mechanism again is seated in the hub shell 12, which contains two planetary gears 80 and 81 arranged one behind the other on the hub shaft 1. The first planetary gear 80, situated on the drive side and in the vicinity of the actuator 7, contains a first planet carrier 82 with at least one first planet wheel 83 having at least two stages 83a, 83b of different diameters, wherein the stage 83a has a larger diameter and meshes with a first sun wheel 84 of a comparatively small diameter, while the stage 83b, which has a smaller diameter, is in engagement with a second sun wheel 85, which has a correspondingly larger diameter. The second planetary gear 81, which is axially farther distant from the actuator 7, contains a second planet carrier 86 with at least one second planet wheel 87, which also has at least two stages 87a, 87b of different diameters, wherein the stage 87a with the larger diameter is in engagement with a third sun wheel 88 of comparatively small diameter, and the stage 87b having the smaller diameter is in contact with a fourth sun wheel 89, which has a correspondingly larger diameter.

While the first planet carrier 82 is used for driving and to this end is fixedly connected with the actuator 7, the second planet carrier 86 is provided for the power take-off and to this end, contrary to FIGS. 1 to 9, depending on whether a seven speed or a fourteen speed gear is to be realized, is connected either directly with the hub shell 12 or with the add-on set, which contains the third planetary gear 35 and has been extensively described by means of FIGS. 1 to 9. Analogous to FIGS. 1 to 9, a gearshift mechanism is provided for the provision and selection of the several gear ratios between the actuator 7 and the hub shell 12, which has means 90, 91, 92 and 93, preferably in the form of clutches, by means of which the sun wheels 84, 85, 88 and 89 can be selectively connected with the hub shaft 1. If in addition a free-wheeling device for the hub shell 12 is desired, is can be connected with the planet carrier 86 via an appropriate ratchet wheel support or the like.

In accordance with a special characteristic of the invention, the two planetary gears 80 and 81 are not coupled by a common strip, as in FIGS. 1 to 9, but by a common ring gear 94, which is arranged coaxially in respect to the hub shaft 1 and has two stages, which are fixedly connected with each other and which are in engagement with respective stages 83a, 83b, or respectively 87a, 87b, of the first, or respectively second planet wheels 83, or respectively 87. In accordance with a particularly preferred embodiment of the invention, the two planetary gears 80, 81 are again constructed and arranged laterally reversed in relation to an imaginary plane of symmetry extending between them and vertically in relation to the hub shaft 1, wherein the two stages of the ring gear 94 are in engagement with the planet wheel stages 83b, 87b in the exemplary embodiment. As for the rest, the arrangement is analogous to FIGS. 1 to 9, in particular in respect to the embodiment of the various clutches.

An advantage of the embodiment in accordance with FIG. 10 lies in that the common ring gear 94 can be designed as a flyingly mounted, rotating toothed ring having a continuously variable interior tooth arrangement, without stages, which arrangement therefore can be made very light and in one piece. Thus the ring gear 94 as the gear element with the larger diameter is practically reduced to the presence of teeth and requires no wall elements and coupling elements fastened thereon, which would allow a selective coupling with the actuator 7 or another gear element.

Initially, the four clutches 90 to 93 are used for producing different gear steps. Since the actuator 7 is fixedly connected with the first planet carrier 82, and the second planet carrier 86 constitutes the power take-off, for example the first and the third sun wheel 84, 89 are connected with the hub shaft 1 by means of the clutches 90 and 92, while the sun wheel 85, 88 can freely rotate. In this way the first planetary gear 80 determines the rpm of the ring gear 94 which, in turn, drives the planet wheel 87. The latter rolls off on the fixed third sun wheel 89, which by means of this determines the rpm of the second planet carrier 86. A further total gear ratio can be provided in that the clutches 91, 93 are engaged and the clutches 90, 92 are disengaged, so that now the sun wheels 85, 88, which are connected with the hub shaft 1, determine the total gear ratio. Further gear ratios can be provided in that the sun wheels 84, 88, or respectively 85, 89 are connected with the hub shaft 1. However, with a laterally reversed design of the two planetary gears 80, 81, this respectively results in a total gear ratio of 1:1, i.e. in a direct gear step.

In accordance with a further, particularly essential characteristic of the invention, analogous to FIGS. 1 to 9 the shifting device has two further clutches 95 and 96, for increasing the number of gear steps in spite of the use of the common ring gear 94, of which the clutch 95 is used for the selective connection of the first planet carrier 82 with the first sun wheel 84, while the second planet carrier 86 can be selectively coupled with the fourth sun wheel 88 by means of the second clutch 96 (FIG. 10). By means of this, when the clutch 95 is connected, the first planetary gear 80 is blocked and, when the clutch 96 is connected, the second planetary gear 81 is blocked, i.e. the ring gear 94 always turns with the rpm of the actuator 7, when the clutch 95 is connected while, with the clutch 96 connected, the second planet carrier 86 always rotates at the rpm of the ring gear 94. Preferably the two clutches 95, 96 are designed the same as the above mentioned clutches 31 to 32 (FIGS. 1 to 9).

With the laterally reversed construction of the planetary gears 80, 81, it is possible by means of the clutches 95, 96 to set further gear steps in addition to the two gear steps described above, as follows: if the clutch 95 is engaged and the clutch 96 is disengaged, it is possible by means of the clutches 92, 93 to selectively connect the sun wheel 89 or the sun wheel 88 with the hub shaft 1 and to release the respectively other sun wheel, which results in two gear ratios, determined by the second planetary gear 81, between the ring gear 94 and the planet carrier 86, because the gear ratio of the first planetary gear 80 is 1:1. But if the clutch 96 is engaged and the clutch 95 disengaged, the ratio of the second planetary gear 81 is fixed at 1:1, while two gear ratios, determined by the first planetary gear 80, between the actuator 7 and the ring gear 94 can be adjusted, in that one of the sun wheels 84, 85 is selectively connected with the hub shaft 1 by means of the clutches 90, 91. Finally, by engaging both clutches 95, 96 it is also possible in this way to provide a gear ratio 1:1 between the actuator 7 and the planet carrier 86. Therefore the multispeed hub constituted by the planetary gears 80, 81 is a seven speed gear hub.

A particular characteristic of the clutches 95, 96 lies in that by means of them the sun wheels 84, 88 are connected with the actuator 7, or respectively the hub shell 12, or respectively the add-on set, in addition to the associated planet carrier 82, or respectively 86, and not in place of these. Therefore, when actuating the clutches 95, 96, always only a portion of the drive force coming from the actuator 7, or power take-off force respectively exerted on the hub shell 12 is shifted, and the shifting has the only purpose of blocking the respective planetary gear or to cancel the blockage. Because of the special configuration of the described gearshift mechanism in accordance with FIG. 10 it is possible to achieve that, for example, only approximately 35% of the total force must be shifted.

The gearshift mechanism in accordance with FIG. 10 can be operated with the same number of teeth as the gearshift mechanism in accordance with FIGS. 5 and 6, wherein the large, or respectively the small planet wheel stages 83a, 87a, or respectively 83b, 87b have the same number of teeth as the large, or respectively the small planet wheel stages 18b, 21b, or respectively 18a, 21a. This is similarly true for the associated sun wheels. The only difference is that here the first planetary gear 80 always operates only as a step-up gear, and the second planetary gear 81 only as a reduction gear. The result then is in particular, that the gear ratios of planetary gear 80 are approximately 0.774 with the clutch 90 engaged, and approximately 0.682 with the clutch 91 engaged, while the gear ratios of the planetary gear 81 are approximately 1.467 with the clutch 92 engaged and approximately 1.292 with the clutch 93 engaged. By means of this and with an analogous application of the different clutches it is possible to obtain the same gear steps and gear jumps as those which had been extensively explained above by means of Table 2 in connection with the gearshift mechanism in accordance with FIGS. 1 to 9, and as represented in the following Table 3:

TABLE 3

| Gear Step | Clutch | | | | | | | Gear Ratio | Step Jump |
| --- | --- | --- | --- | --- | --- | --- | --- | --- | --- |
| | 90 | 91 | 92 | 93 | 95 | 96 | 41 | | |
| 1st Gear |   |   | x |   | x |   |   | 3.591 | 13.5% |
| 2nd Gear |   |   |   | x | x |   |   | 3.163 | 13.8% |
| 3rd Gear | x |   | x |   |   |   |   | 2.779 | 13.5% |
| 4th Gear |   |   |   |   | x | x |   | 2.448 | 13.5% |
| 5th Gear |   | x |   | x |   |   |   | 2.157 | 13.8% |
| 6th Gear | x |   |   |   |   | x |   | 1.895 | 13.5% |
| 7th Gear |   | x |   |   |   | x |   | 1.670 | 13.8% |
| 8th Gear |   |   | x |   | x |   | x | 1.467 | 13.5% |
| 9th Gear |   |   |   | x | x |   | x | 1.292 | 13.8% |
| 10th Gear | x |   | x |   |   |   | x | 1.135 | 13.5% |

TABLE 3-continued

| | | | Clutch | | | | | |
|---|---|---|---|---|---|---|---|---|
| Gear Step | 90 | 91 | 92 | 93 | 95 | 96 | 41 | Gear Ratio | Step Jump |
| 11th Gear | | | | | x | x | x | 1.000 | 13.5% |
| 12th Gear | | x | | x | | | x | 0.881 | 13.8% |
| 13th Gear | x | | | | | x | x | 0.774 | 13.5% |
| 14th Gear | | x | | | | x | x | 0.682 | — |

Otherwise, the same advantages result as when using the gearshift mechanism in accordance with FIGS. 1 to 9.

The invention is not limited to the exemplary embodiments described, which can be changed in many ways. It is in particular possible to assign more than two sun wheels to the two planetary gears 15, 16, or respectively 80, 81, and correspondingly more than two stages to the associated planet wheels, in order to provide in this way further gear ratios. It is furthermore possible and advantageous to respectively make the actuator 7 and the ring gear 7 or the planet carrier 82, and possibly also the ring gear 25 or the planet carrier 86 and the sun wheel 36, of one piece. Furthermore, the bridging of the two planetary gears 15, 16, or respectively 80, 81 by means of the clutches 31, 32, or respectively 95, 96, can also be provided in those cases, where the sun wheels and the associated planet wheel stages are not symmetrically arranged. In addition, the sun wheels and associated planet wheel stages can be connected with another fixed element of the hub shaft 1. Furthermore, tooth numbers different from the ones mentioned, which are only to be considered as examples, can be selected. Most of the mentioned advantages result regardless of which type of shifting device is used for the connection of the ring gears 24, 25, or respectively 82, 86 with the associated sun wheel. In particular, denture clutches, claw clutches, free-wheeling ratchet devices, grip roller free-wheeling devices and/or grip body free-wheeling devices can be employed, which are also effective regardless whether there are components inside the gear hub, such as a brake, for example, which have additional functions. The invention furthermore is not limited to the described add-on set with the planetary gear 35. Instead, the arrangement could also be made such that in FIG. 5, or respectively in FIG. 10, the clutch 41 is arranged between the ring gear 25, or respectively the planet carrier 86, and the planet carrier 37 of the planetary gear 35. In this case, too, the planetary gear 35 would act as a reduction gear, when the clutch 41 is disengaged, and as a direct gear ratio (1:1), when the clutch 41 is engaged. It would furthermore be possible, to employ the planetary gear 35 as an add-on set and to intersperse it between the actuator 7 and the first planetary gear 15, or respectively 80. Aside from that, the multispeed gearshift mechanism is not limited to use within the hub of a wheel. The gearshift mechanism could in particular be used, for example, as an intermediate shaft mechanism, and could be arranged for this purpose at a location between the bottom bracket bearing and the hub of one of the two wheels of a bicycle, in which case it could be connected via appropriate gear wheels, chains or the like on the drive side with the bottom bracket bearing, and on the power take-off side with a wheel. Even the employment of the gearshift mechanism within the bottom bracket bearing would be conceivable. Finally, it is understood that the various characteristics can also be employed in combinations other than the ones described and represented in the drawings.

What is claimed is:

1. A multispeed gearshift mechanism for bicycles, comprising: a shaft (1), which can be mounted, fixed against relative rotation, on a bicycle frame, an actuator (7), rotatably seated on the shaft (1), a shell (12), rotatably seated on the shaft (1), a gearshift mechanism, which is provided with a first and a second planetary gear (15, 16, or respectively 80, 81), is arranged in the shell (12) and coupled with the actuator (7) and the shell (12), for making available several gear ratios between the actuator (7) and the shell (12), wherein the planetary gears (15, 16, or respectively 80, 81) at least have respectively two sun wheels (19, 20, 22, 23, or respectively 84, 85, 88, 89), which are coaxial in relation to the shaft (1), at least one planet carrier (17, 82, 86) with appropriately stepped planet wheels (18, 21, or respectively 83, 87), which are in engagement with the sun wheels (19, 20, 22, 23, or respectively 84, 85, 88, 89), and at least one ring gear (24, 25, or respectively 94), which is in engagement with the planet wheels (18, 21, or respectively 83, 87), and having a shifting device for selecting the gear ratios by the selective connection of the sun wheels (19, 20, 22, 23, or respectively 84, 85, 88, 89) with the shaft (1), characterized in that the the shifting device has means (31, 32 or, respectively, 95, 96) for the selective connection of the ring gear (24, 25) of the first and/or second planetary gear (15, 16) with one of the sun wheels 19, 22) of the same planetary gear (15, 16) or for the selective connection of the planet carrier (82, 86) of the first and/or second planetary gear (80, 81) with one of the sun wheels (84, 88) of the same planetary gear (80, 81).

2. The multispeed gearshift mechanism in accordance with claim 1, characterized in that the means (31, 32, or respectively 95, 96) contains a clutch with a free-wheeling device.

3. The multispeed gearshift mechanism in accordance with claim 1, characterized in that the ring gears (94) of the two planetary gears (80, 81) are fixedly connected with each other.

4. The multispeed gearshift mechanism in accordance with claim 3, characterized in that the two ring gears are made of a component produced in one piece and constitute a ring gear (94), which is common to both planetary gears (80, 81).

5. The multispeed gearshift mechanism in accordance with claim 3, characterized in that the drive of the gearshift mechanism is performed via the planet carrier (82) of the first planetary gear (80), and the power take-off of the gearshift mechanism via the planet carrier (86) of the second planetary gear (81).

6. The multispeed gearshift mechanism in accordance with claim 5, characterized in that the two planet carriers (82, 86) can be selectively connected with the sun wheel (84, 88) of the associated planetary gear (80, 81).

7. The multispeed gearshift mechanism in accordance with claim 3, characterized in that said at leat two sun wheels (19, 20, 84, 85) of said first planetary gear (15, 80) have different diameters and that said at least two sun wheels (22, 23, 88, 89) of said second planetary gear (16, 81) have also different diameters.

8. The multispeed gearshift mechanism in accordance with claim 7, characterized in that the two sun wheels (19, 20, 22, 23, or respectively 84, 85, 88, 89) of each planetary gear (15, 16, or respectively 80, 81) are identically embodied in pairs.

9. The multispeed gearshift mechanism in accordance with claim 7, characterized in that the common ring gear (94) of the planetary gears (80, 81) comes into engagement with those stages (83b, 87b) of the associated planet wheels (83, 87), which have the smaller diameter.

10. The multispeed gearshift mechanism in accordance with claim 7, characterized in that the two ring gears (24, 25)

of the planetary gears (15, 16) come into engagement with those stages (18a, 21a) of the associated planet wheels (18, 21), which have the smaller diameters.

11. The multispeed gearshift mechanism in accordance with claim 7, characterized in that the two planetary gears (15, 16, or respectively 80, 81) are embodied and arranged laterally reversed.

12. The multispeed gearshift mechanism in accordance with claim 1, characterized in that the planet carriers of the two planetary gears (15, 16) are fixedly connected with each other.

13. The multispeed gearshift mechanism in accordance with claim 12, characterized in that the two planet carriers are made of a component produced in one piece and constitute a planet carrier (17) which is common to both planetary gears (15, 16).

14. The multispeed gearshift mechanism in accordance with claim 5, characterized in that the drive of the gearshift mechanism is performed via the ring gear (24) of the first planetary gear (15), and the power take-off of the gearshift mechanism via the ring gear (25) of the second planetary gear (16).

15. The multispeed gearshift mechanism in accordance with claim 14, characterized in that both ring gears (24, 25) can be selectively connected with the sun wheel (19, 22) of the associated planetary gear (15, 16).

16. The multispeed gearshift mechanism in accordance with claim 1, characterized in that it is arranged as a seven speed gear.

17. The multispeed gearshift mechanism in accordance with claim 1, characterized in that the two planetary gears (15, 16, or respectively 80, 81) are connected in series, and that in this case the one planetary gear (16, or respectively 80) has a gear ratio of less than one, and the other planetary gear (15, or respectively 81) has a gear ratio of more than one.

18. The multispeed gearshift mechanism in accordance with claim 1, characterized in that a third planetary gear (35), which has a fifth sun wheel (36), a third planet carrier (37) with at least one third planet wheel (38), and a ring gear (39), is connected downstream of the second planetary gear (16, or respectively 81).

19. The multispeed gearshift mechanism in accordance with claim 18, characterized in that the third planet carrier (37) is connected with the shell (12), the second ring gear (39) is connected via a free-wheeling device (40) with the shaft (1), and the fifth sun wheel (36) is connected with the second planet carrier (86) or the second ring gear (25) of the second planetary gear (16, or respectively 81).

20. The multispeed gearshift mechanism in accordance with claim 19, characterized in that the shifting device is provided with connecting means (41) for the selective connection of the second planet carrier (86) or the second ring gear (25) with the ring gear (39) of the third planetary gear (35).

21. The multispeed gearshift mechanism in accordance with claim 20, characterized in that the connecting means (41) contains a clutch with a free-wheeling device.

22. The multispeed gearshift mechanism in accordance with claim 1, characterized in that it is designed as a multispeed gear shaft, wherein the shaft (1) is a hub shaft and the shell (12) a hub shell.

* * * * *